Patented Nov. 19, 1946

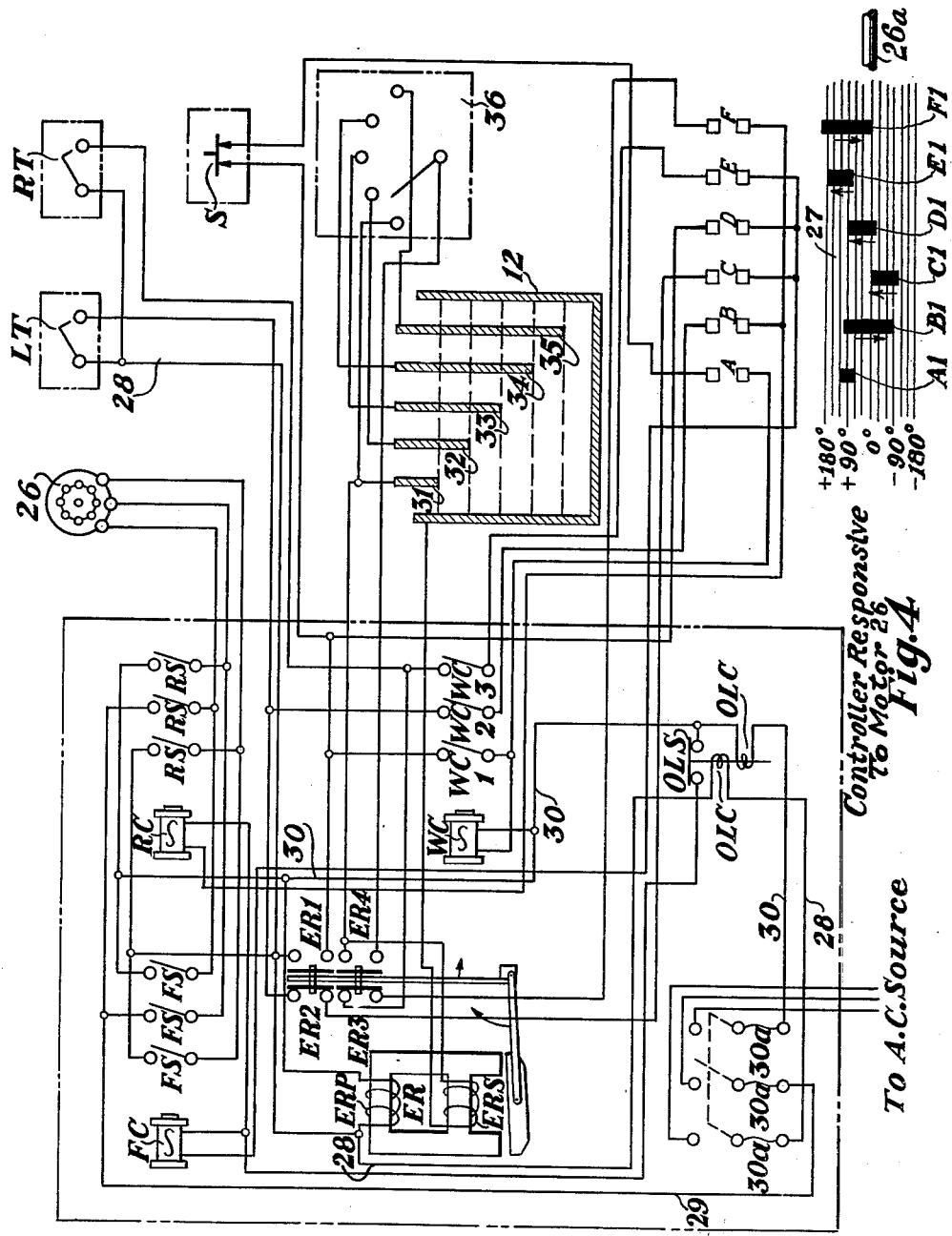

2,411,309

UNITED STATES PATENT OFFICE 2,411,309

LIQUID MEASURING AND DELIVERY MEANS

Arthur J. Whitcomb and Gordon Fox, Chicago, Ill., assignors to Freyn Engineering Company, Chicago, Ill., a corporation of Maine Application January 25, 1941, Serial No. 375,910

17 Claims. (Cl. 226—107)

The present invention relates to improvements in liquid measuring and delivery means.

The present invention will be described in connection with means for supplying measured amounts of water to the skip tubs of a blast furnace, though as the description proceeds it will be clear that the invention has a broader application.

An object of the present invention is to provide mechanism by means of which measured amounts of water or other liquid may be efficiently measured and delivered to predetermined positions.

A further object is to provide improved mechanism whereby the amounts of liquid to be delivered to different charges may be expeditiously measured off and delivered upon the happening of predetermined events.

A further object is to provide a combination of blast furnace skip hoist and liquid measuring and delivering means whereby measured amounts of liquid may be expeditiously delivered to the skip tubs of the hoist.

A further object is to provide means, in a combination such as referred to above, whereby different measured quantities of liquid can be readily selected for delivery to predetermined positions.

A further object is to provide liquid measuring and delivering mechanism which is simple in construction and effective in service.

A further object is to provide means for measuring and delivering water or the like well adapted to meet the needs of commercial service.

Further objects will appear as the description proceeds.

Referring to the drawings—

Figure 4 is a modified wiring diagram which is the electrical equivalent of the wiring diagram appearing in Figure 3 but embodies electrical symbols of a different type.

Figure 1:
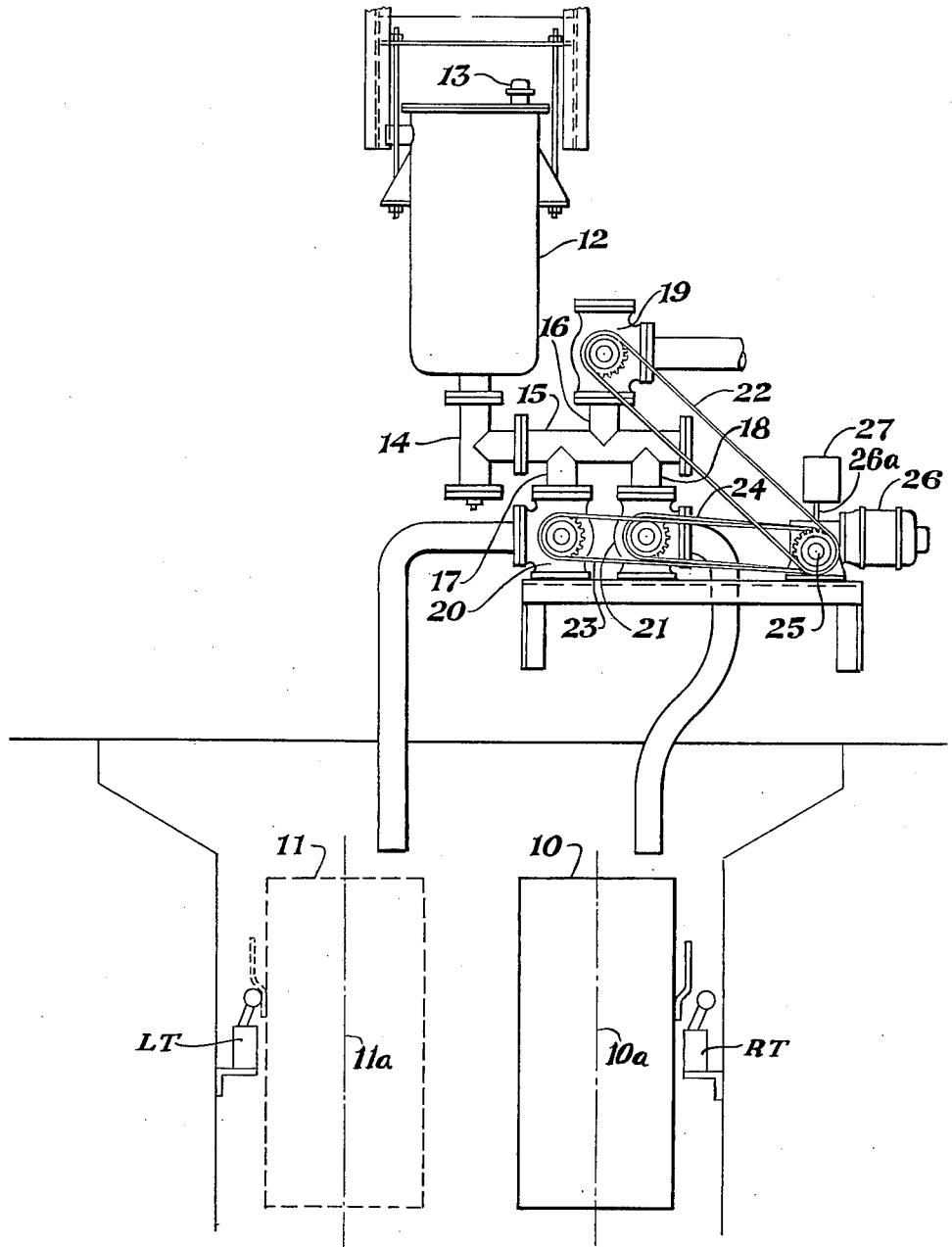
Figure 1 is a diagrammatic view of part of a skip hoist structure having water measuring and delivering means associated therewith embodying the principles of the present invention.

Referring first to Figure 1, the numerals 10 and 11 illustrate two skip tubs such as ordinarily provided in blast furnace installations. The skip tub 10, which is shown in full lines, is in the skip pit in a position to receive material from a scale car or the like (not illustrated). The skip tub 11, which is illustrated in dotted lines, will, of course, be adjacent to the top of the furnace when the skip tub 10 is in the position shown. Alternatively, the skip tub 10 will be adjacent to the top of the furnace when the skip tub 11 is in the position illustrated.

The present invention provides mechanism whereby water or other liquid may be selectively delivered to the skip tub 10 or skip tub 11 when either of said tubs is in the position illustrated, together with means for selectably controlling the amount of such liquid delivered to said tubs.

The numeral 12 indicates a tank or reservoir chamber for water or the like. Mounted at the top of said tank 12 is the electrode holder, indicated as a whole by the numeral 13. Said electrode holder 13 is adapted to carry a plurality of electrodes (not illustrated in Figure 1), which may be individually positioned to extend down into the tank 12 to predetermined selectable positions. Connected to the bottom of the tank 12 is the elbow connection 14, which leads to the pipe 15. Said pipe 15 is provided with the branch pipes 16, 17 and 18, which are connected, respectively, to the valves 19, 20 and 21. The valve 19 may be connected to a source of water supply. The valve 20 may be connected to deliver water to the left-hand skip tub 11 when said tub 11 is in the skip pit. The valve 21 may be connected to deliver liquid to the skip tub 10 when said tub 10 is in the pit (position illustrated in full lines in Figure 1). Referring to Figure 1, limit switch LT associated with the left-hand skip tub 11 is moved to closed position when the corresponding skip tub 11 is in its loading position in the skip pit. The full line position of the limit switch LT is the open position of said switch, which open position is taken when said left skip tub 11 is not in its loading position in the skip pit. The limit switch RT associated with the right skip tub 10 is shown in full lines in its closed position, having been moved to closed position by said right skip tub 10 when said skip tub has moved to its loading position in the skip pit. The dotted line position of the limit switch RT indicates the open position of said switch, which open position is taken when the right skip tub 10 is not in its loading position in the skip tub.

The mechanism for moving the skip tubs 10 and 11 is not illustrated. As is well known to those familiar with blast furnace practice, the skip tubs 10 and 11 will be connected to the two ends of a cable, which, by means of a drum or other hoisting mechanism (not illustrated), will hoist said skip tubs alternately. When one of said skip tubs is up at the top of the blast furnace, the other is down in loading position in the skip pit and is then adapted to receive materials and water. Said skip tubs, of course, travel on different parallel tracks. As well understood by those skilled in the blast furnace art, each skip tub 9 and 10 has its own independent course of travel along lines indicated by the numerals 10a and 11a respectively.

The three valves 19, 20 and 21 may be operated in unison, and for this purpose said three valves are connected by sprocket chains 22, 23 and 24, respectively, to a sprocket wheel 25 adapted to be driven by the motor 26. The motor 26 through the shaft 26a also drives the drum controller 27. For purposes of convenience and simplicity of disclosure the member 27 has been illustrated as a drum switch or drum controller. As well known to those skilled in the art, a cam switch and a drum switch or drum controller are mechanical equivalents, and it will doubtless be preferred by many using the present invention to use a modern cam switch in place of the old-fashioned drum switch or drum controller. The motor 26 positively drives the moving parts of the valves 19, 20 and 21, and said motor 26 also positively drives the member 27. Therefore there is a definite relationship between the positions of the moving parts of said valves and the contacts responsive to the angular position of the member 27.

Figure 2:
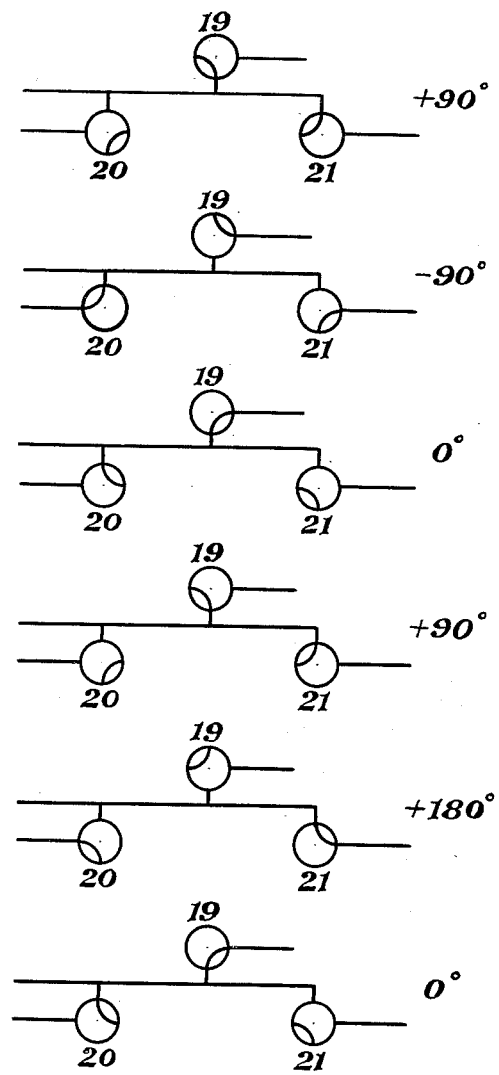
Figure 2 is a diagrammatic view illustrating the relative positions of the valves forming part of the structure illustrated in Figure 1.

The member 27, in combination with a start button or the like and switch means, to be referred to presently, cooperates in the control of and responds to the operation of the motor 26 to position the valves 19, 20 and 21. The member 27 has certain alternative rotative positions which control the positioning of the valves 19, 20 and 21 in the manner illustrated diagrammatically in Figure 2, from which it will be noted that in the plus 90° position all three valves are closed. This positioning of the valves will be had when the tank 12 is full. In the minus 90° position of the controller 27 the valve 20 is open, whereby liquid may be delivered from the tank to the left-hand skip tub 11. In the zero position of the cam limit switch 27 the valve 19 is open to the source of liquid supply, at which time the tank 12 will be filling with liquid. At this time the valves 20 and 21 are closed. In the next position of the valves, which is the plus 90° position above referred to, all valves are closed, at which time the tank 12 is full. In the next position of the valves, indicated as the plus 180° position, the valves 19 and 20 are closed and the valve 21 is in position to deliver liquid from the tank 12 to the right-hand skip tub 10. The next position corresponds to the zero position of the controller 27, as above referred to, in which position the valve 19 is open to permit the filling of the tank 12, whereas the connections to the two skip tubs are closed.

Figure 3:
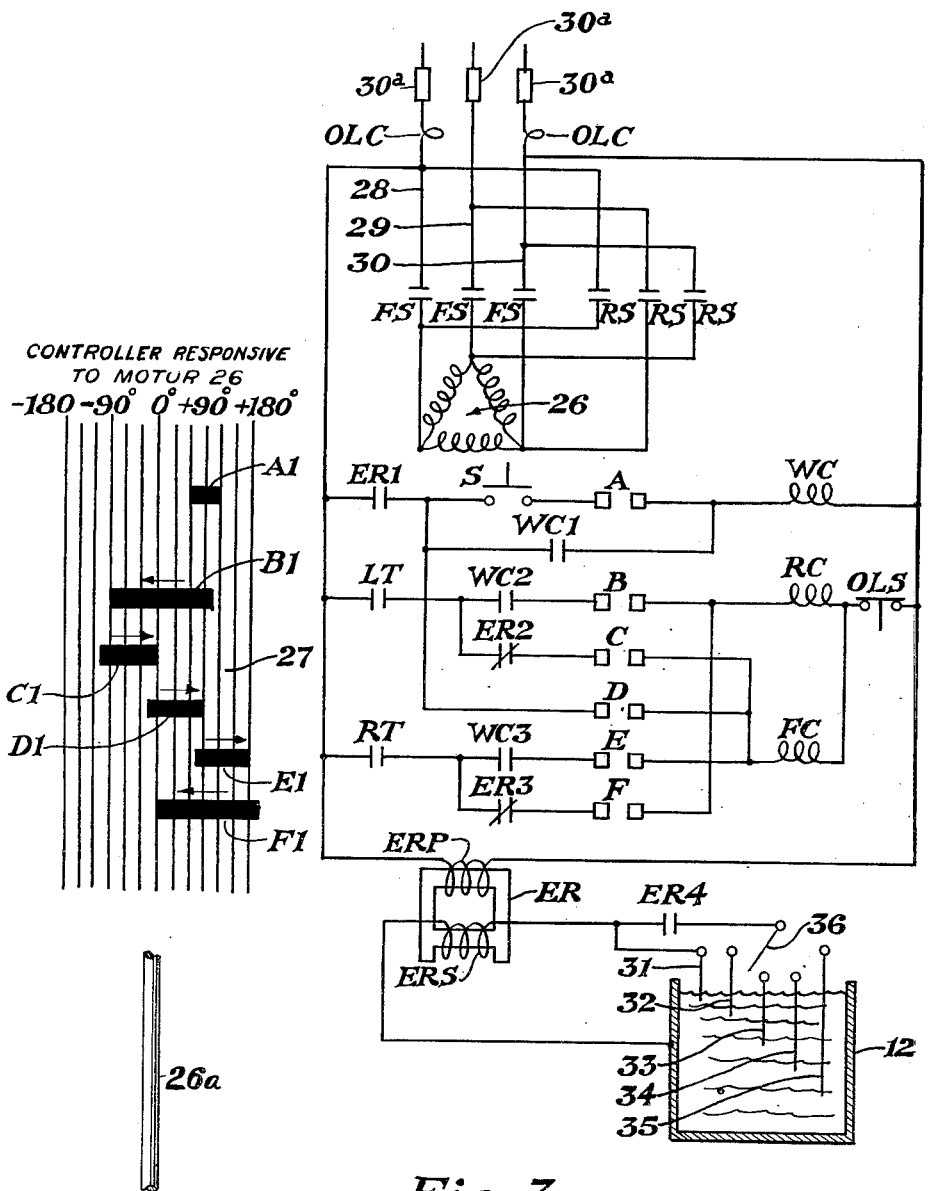
Figure 3 is a wiring diagram of the electrical connections of the mechanism illustrated in Figure 1.

By reference to Figure 3 it will be noted that the motor 26 is illustrated as a three-phase motor, the three terminals of which are connected, respectively, to the three wires 28, 29 and 30, each protected by a fuse 30a. Two of the wires of the three-phase system are provided with the operating coils OLC of an overload relay having the switch OLS. Each of the wires 28, 29 and 30 is provided with a switch FS, each biased to open position but all adapted to be closed by the energization of the coil FC, the connections of which will be referred to presently. Each of the wires 28, 29 and 30 is connected to a terminal of the three-phase motor through a switch RS. The three switches RS are biased to open position but are adapted to be closed upon energization of the coil RC, the connections of which will be referred to presently. With switches FS—FS—FS in closed position while switches RS—RS—RS are open, the motor 26 will be caused to rotate in one direction, whereas with switches FS—FS—FS in open position with switches RS—RS—RS closed, said motor 26 will be caused to rotate in the opposite direction. The set of switches FS and the set of switches RS are mechanically interlocked so that when one set of switches closes, the closure of the other set of switches is prevented.

Said motor 26, as mentioned above, is adapted to drive the member 27. Said member is illustrated as having four positions, indicated, respectively, as the minus 90° position, in which liquid is discharged to the left skip tub; the zero position, in which water is delivered to the tank 12; the plus 90° position, in which the tank is full; and the plus 180° position, in which water is discharged from the tank 12 to the right-hand skip tub. Said member 27 is adapted to control the bridging and unbridging of a plurality of pairs of contacts, indicated by the letters A, B, C, D, E, F. The mechanism of the member 27 need not be described in detail. It will be sufficient to state that the arrows appearing upon the development of the drum 27 in Figure 3 indicate the relative movement of the corresponding pairs of contacts A, B, C, D, E and F along the segments indicated in solid black in said figure, which segments are indicated by the characters A1, B1, C1, D1, E1 and F1.

Connected across the wires 28 and 30 of the three-phase system is a circuit including the switch ER1, biased to open position, the start switch S, biased to open position, the pair of contacts A and the operating coil WC. Said operating coil WC is part of a relay which includes the switch WC1 biased to open position, the switch WC2 biased to open position, and the switch WC3 biased to open position. The switch WC1 is in bridging relationship with the circuit which includes the start switch S and the pair of contacts A, and completes a holding circuit for said start switch S after it has been momentarily closed and allowed to open again. Also connected across two wires 28 and 30 of the three-phase circuit is the circuit including the limit switch LT (responsive to the movement of the left-hand skip tub, being closed when said left-hand skip tub is in the skip pit); the switch WC2 biased to open position; the pair of contacts B; the coil RC; and the overload switch OLS, biased to closed position. Bridged across the circuit which includes the switch WC2, the pair of contacts B and the coil RC is a circuit including the switch ER2 biased to closed position, the pair of contacts C, and the operating coil FC.

Also connected across the wires 28 and 30 is the circuit including the switch ER1 above referred to, biased to open position, the pair of contacts D, the operating coil FC and the overload switch OLS. Also connected across the wires 28 and 30 is the circuit including the switch RT biased to open position, the switch WC3 above referred to, the pair of contacts E, the operating coil FC and the overload switch OLS. The switch RT is a limit switch and is closed when the right-hand skip tub 10 is in the skip pit.

A further circuit connected across the wires 28 and 30 includes the limit switch RT biased to open position, the switch ER3 biased to closed position, the pair of contacts F, the operating coil RC and the overload switch OLS. Said limit switches LT and RT are shown, for purposes of simplicity, as hatchway limit switches operated directly by the skip tubs. In practice it probably will be preferred to utilize equivalent contacts associated with the electrical circuits of the hoist (not shown) which cause skip tubs 10 and 11 to move into and out of the skip pit.

Also connected across the wires 28 and 30 is the primary coil ERP of the relay ER. The secondary coil ERS of the relay ER is connected to be responsive to the level of water in the tank 12. The tank 12 is shown as being provided with the electrodes 31, 32, 33, 34 and 35, which extend to different levels in said tank 12. The electrode 31 has its lower extremity positioned at the level for a full tank. The secondary coil ERS is electrically connected to the water within the tank 12 through the wall of the tank and to the electrode 31. The electrodes 32, 33, 34 and 35 have their upper extremities connected to a dial switch, indicated by the numeral 36. By means of the dial switch 36 the various electrodes, 32, 33, 34 and 35, may be selectably connected to the secondary coil ERS of the relay ER, circuit being completed through the liquid in the tank 12. The switch 36 is connected through the switch ER4, biased to open position, to the secondary coil ERS and to the water in the tank 12. The switch ER1 biased to open position, the switch ER2 biased to closed position, the switch ER3 biased to closed position and the switch ER4 biased to open position are all responsive to the relay ER. The disclosed apparatus includes a plurality of instrumentalities which may be grouped as follows:

(a) The drum controller or drum switch 27 with its corresponding pairs of contacts A, B, C, D, E and F;

(b) The limit switches LT and RT;

(c) The control system for the motor 26 which includes the switches FS—FS—FS, RS—RS—RS, with their operating coils FC and RC; the switches WC1, WC2, WC3, with their operating coil WC (comprising a relay); the switches ER1, ER2, ER3, ER4, which are a part of relay ER, which relay includes the coils ERP and ERS; and (d) The water level detector including the electrodes 31, 32, 33, 34, 35 and the dial switch 36.

In describing the mode of operation of the present invention it may be assumed that the tank 12 is full of water, which thereby forms an electrical connection with the electrode 31, completing the electrical circuit of the secondary winding ERS of the relay ER. As indicated hereinabove, when the tank is full of water the controller 27 is in the plus 90° position.

When the start switch S is closed, a circuit is completed through the switch ER1 (closed because the secondary winding ERS of the relay ER is energized), and through the pair of contacts A, which are closed by the segment A1 when the controller 27 is in the plus 90° position. The completion of this circuit energizes the water charging coil WC, which closes the switch WC1, thereby establishing a maintaining circuit for the coil WC after the start switch S has been allowed to open.

The energization of the water charging coil WC causes the closing of the switches WC2 and WC3. At this time, that is—with the controller 27 in the plus 90° position, the pair of contacts B are closed by the segment B1. When the left-hand skip tub 11 reaches the skip pit, the limit switch LT is closed. Closure of the limit switch LT completes a circuit through the switch WC2, the pair of contacts B, the coil RC and overload switch OLS. Energization of the coil RC results in the closure of the switches RS—RS—RS, causing the motor 26 to operate in a direction to open the valve 20 to discharge water to the left-hand skip tub 11. Operation of the motor 26 in this direction moves the controller 27 to the minus 90° position, wherein the pair of contacts B are opened.

As water is discharged from the tank 12 the level thereof finally recedes to a point below the electrode selected by the dial switch 36. When this happens the circuit of the secondary coil ERS of the relay ER is broken, whereby said relay ER is deenergized, causing the switch ER1 to open, breaking the circuit of the coil WC of the water charging relay, whereby the switch WC1 is opened.

At this time, that is—when the member 27 is in the minus 90° position, the pair of contacts C are closed by the segment C1 and a circuit is completed from the wire 28 through the limit switch LT, switch ER2, the pair of contacts C, through the coil FC and overload switch OLS to the wire 30. Energization of the coil FC causes the closure of the switches FS—FS—FS, causing the motor 26 to operate in a forward direction and driving the member 27 until the pair of contacts C are opened. In this position the valve 19 is open and the valves 20 and 21 are closed, whereby water will be admitted to fill the tank 12. The skip may leave the pit at this point in the cycle.

When the water reaches the electrode 31, indicating a full tank, the relay ER is again actuated, thereby opening the switches ER2 and closing the switches ER1 and ER4. Closing of the switch ER4 completes a holding circuit for the relay ER until such time as this holding circuit is broken by reason of the water falling below the lower extremity of the selected electrode 32, 33, 34 or 35.

Water will be delivered through the valve 19 to the tank 12 until it reaches the electrode 31, completing the circuit of the secondary winding ERS of the relay ER. Inasmuch as the pair of contacts D are closed when the member 27 is in the zero degree position, the member 27 will continue to rotate until it reaches the plus 90° position. In this movement the valve 19 has been moved to the off position. At this time, as indicated above, the tank is full.

By closure of the start switch S the contacts WC2 and WC3 will be closed, as indicated at the beginning of the discussion of the mode of operation. Assuming that the left-hand skip tub 11 is next to reach the skip pit, the operation of the various instrumentalities is carried through as described above. On the other hand, assuming that the right-hand skip tub 10 is next to reach the skip pit after closure of the start switch S, the limit switch RT will be closed. When the member 27 is in the plus 90° position the pair of contacts E are closed by the segment E1, and accordingly when the limit switch RT is closed a circuit is completed from the wire 28 through the switch RT, switch WC3 (closed at this time), the pair of contacts E, operating coil FC and the overload switch OLS to the wire 30. The energization of the coil FC results in the closure of the switches FS—FS—FS, thereby causing the motor 26 to operate in a direction to open the valve 21 to discharge water to the right-hand skip tub 10. This moves the member 27 to the plus 180° position, wherein the pair of contacts E are opened and the coil FC is deenergized and the switches FS—FS—FS are opened.

As the water is discharged from the tank 12 through the valve 21 to the right-hand skip tub, the water level falls below the electrode selected by the dial switch 36. When this happens the relay ER is deenergized, causing the switch ER1 to open. This results in the deenergization of the water charging coil WC, opening the switch WC1.

The deenergization of the relay ER causes a circuit to be completed from the wire 28, through the limit switch RT, switch ER3, the pair of contacts F, operating coil RC and overload switch OLS to the wire 30. Energization of the coil RC results in the closure of the switches RS—RS—RS, causing the motor 26 to operate in the reverse direction until the pair of contacts F are opened by the segment F1. At this time the valve 19 is open, whereby water will be delivered to the tank 12. The discharge valves 20 and 21 will be closed at this time. When the water reaches the electrode 31, which indicates a full tank, the relay ER is again actuated, thereby opening the switch ER3 and closing the switch ER1. At this time the pair of contacts D are closed by the segment D1, and a circuit is then completed from the wire 28, through the switch ER1, the pair of contacts D, coil FC and overload switch OLS, to the wire 30. Energization of the coil FC results in the closure of the forward switches FS—FS—FS by causing the motor 26 to operate in the forward direction to the plus 90° position, at which position the circuit is interrupted at the pair of contacts D. At this point the tank 12 is full of water and ready for the new cycle.

The diagram illustrated in Figure 4 is electrically the equivalent of the diagram appearing in Figure 3. However, the electrical symbols appearing in Figure 4 may be more familiar to certain of those skilled in the electrical arts than are the symbols used in Figure 3, which are doubtless more familiar to those particularly concerned with the electrical controls of blast furnaces.

It will not be necessary to repeat the mode of operation with particular reference to the diagram appearing in Figure 4 inasmuch as the mode of operation has been fully described above in connection with the diagram appearing in Figure 3.

Though a preferred embodiment of the present invention has been described in detail, many modifications will occur to those skilled in the art. It is intended to cover all such modifications that fall within the scope of the appended claims.

What is claimed is:

1. In combination, a pair of receptacles each having its own independent course of travel, each alternately movable into and out of its respective loading position, a reservoir, a valve cooperating with said reservoir for admitting liquid to said reservoir and other valves for discharging liquid from said reservoir selectably to said receptacles when said receptacles are in charging positions, an electrode in said reservoir adapted to be contacted when said reservoir is filled with liquid to a predetermined maximum amount, electrode means in said reservoir selectably responsive to lower levels of liquid in said reservoir, an electric circuit adapted to be completed when said first-mentioned electrode is contacted by said liquid, means comprising a holding circuit for said first-mentioned electric circuit when said liquid in said reservoir falls below the level of said electrode but is still in cooperative relationship with said electrode means, and motive means for operating said valves, said motive means being responsive to said electrode and electrode means and to the positions of said receptacles and to the positions of said valves.

2. In combination, a pair of receptacles each having its own independent course of travel, a liquid reservoir, said receptacles being movable into and out of different loading positions, valve means for selectably admitting liquid to said reservoir and for selectably discharging liquid from said reservoir at different discharge points to said plurality of receptacles when said receptacles are in their respective loading positions, single motive means for moving said valve means, control circuits for said motive means, said control circuits including a relay responsive to a relatively high level of liquid within said reservoir for causing operation of said motive means, and a holding circuit for said relay for maintaining said relay in operated position until the liquid in said reservoir falls to a predetermined low level, said circuits also including means responsive to the positions of said receptacles for controlling said motive means.

3. In combination, a reservoir, a plurality of receptacles movable into and out of different loading positions, valve means for selectably admitting liquid to said reservoir and selectably discharging liquid from said reservoir to said receptacles when said receptacles are in their respective loading positions, single motive means for operating said valve means, a start switch for said motive means, a holding circuit for said start switch, and means conjointly responsive to the positions of said receptacles and to the positions of said valve means and to the level of liquid within said reservoir for controlling said motive means, said means responsive to the level of liquid within said reservoir including a relay adapted to be operated when the liquid within said reservoir is at a predetermined high level, and a holding circuit adapted to maintain said relay in operated position until said liquid falls to a predetermined lower level.

4. In combination, a reservoir, an inlet valve to said reservoir, a plurality of discharge valves from said reservoir, a single motive means for operating said valves to cause said reservoir to be filled up to a predetermined level with liquid or to discharge selectively through said discharge valves, electrode means for selectively determining said predetermined level and the quantity of liquid discharged through said discharge valves, a plurality of containers adapted selectively to be positioned to receive fluid discharged through said discharge valves, and switch means responsive to the positions of said containers for controlling the discharging of said liquid through said discharge valves.

5. In combination, a liquid reservoir, a valve for admitting liquid thereto, other valves for discharging liquid therefrom, said other valves having communication to different discharge conduits, motive means for operating said valves, switch means driven by said motive means, electrode means for detecting a high liquid level and a plurality of lower liquid levels in said reservoir, and control means responsive to said switch means and to said electrode means to cause said motive means to selectably operate said valves to discharge liquid in quantities selectably predetermined by said electrode means from said reservoir to said conduits and thereafter to replenish the quantity of liquid thus discharged.

6. In combination, a liquid reservoir, a valve for admitting liquid thereto, other valves for discharging liquid therefrom, said other valves having communication to different discharge conduits, motive means for operating all of said valves in unison, switch means driven by said motive means, electrode means for detecting a high liquid level and a plurality of lower liquid levels in said reservoir, control means responsive to said switch means and to said electrode means to cause said motive means to selectably operate said valves to discharge liquid from said reservoir in predetermined quantities to said conduits and thereafter to replenish the quantity of liquid thus discharged, a plurality of receptacles each movable in its own independent course and adapted alternately to be positioned to receive liquid from one or the other of said conduits, and switch means responsive to the positions of said receptacles to determine from which conduit liquid is to be discharged and to permit such discharge only when a receptacle is positioned to receive liquid from its corresponding conduit.

7. In combination, a reservoir chamber, valve means for charging liquid into said chamber and for discharging liquid from said chamber selectably to different discharge regions, a single motive means for said valve means, control means for said motive means having definite positions for controlling said motive means to position said valve means, and limiting means responsive to the levels of liquid within said chamber for controlling said motive means.

8. In combination, a reservoir, an inlet valve to said reservoir, a plurality of discharge valves from said reservoir, a pair of receptacles adapted to be moved alternately into two different receiving positions to receive liquid respectively from said discharge valves, switch means adapted to be actuated by said receptacles, motive means for operating said valves to cause said reservoir to be filled up to a predetermined level with liquid or to discharge selectively through one or the other of said discharge valves in response to said switch means, and control means including electrode means for selectively determining said predetermined level and the quantity of liquid discharged through said discharge valves.

9. In combination, a reservoir, a valve cooperating with said reservoir for admitting liquid to said reservoir, other valves for discharging liquid from said reservoir selectably to different discharge regions, an electrode adapted to be contacted when said reservoir is filled with liquid to a predetermined maximum amount, electrode means selectably responsive to lower levels of liquid in said reservoir, an electric circuit adapted to be completed when said first-mentioned electrode is contacted by said liquid, means comprising a holding circuit for said electric circuit when said liquid in said reservoir falls below the level of said electrode but is still in cooperative relationship with said electrode means, and motive means for operating said valves, said motive means being responsive to said electric circuit and said holding circuit.

10. In combination, a pair of receptacles each having its own independent course of travel, a liquid reservoir, valve means for charging liquid into said reservoir and discharging liquid from said reservoir selectively to either of said receptacles when said receptacles are in their respective loading positions, said valve means providing four alternative conditions for controlling the flow of liquid, to wit: (1) a shut-off condition in which no liquid is permitted to flow; (2) a charging condition in which liquid is being charged into the reservoir; (3) a discharging condition in which liquid is discharged from the reservoir to one of the receptacles; and (4) a discharging condition in which liquid is being discharged from the reservoir to the other of said receptacles; a single motive means for positioning said valve means, a start switch, a relay responsive to said start switch, a holding circuit responsive to said relay, and control means for said motive means conjointly responsive to the levels of liquid within said reservoir and to the positions of said receptacles and to the positions of said valve means and to said relay.

11. In combination, a pair of receptacles each having its own independent course of travel, a liquid reservoir, valve means for charging liquid into said reservoir and discharging liquid from said reservoir selectively to either of said receptacles, a single motive means for positioning said valve means, control means for said motive means, said control means including start switch means and a relay responsive to said start switch means, and also including limit switch means responsive to the loading positions of said receptacles whereby liquid from said reservoir may be caused to discharge in response to said relay to either of said receptacles upon their arrival in their respective loading positions irrespective of which receptacle has previously received liquid from said reservoir.

12. In combination, a pair of receptacles each having its own independent reciprocatory course of travel and each movable into its own respective loading position, a reservoir having a liquid storing chamber, valve means for controlling the inflow of liquid to said chamber and the discharge of liquid from said chamber selectably to either of said receptacles when said receptacles are in loading positions, motive means for said valve means, a start switch for said motive means, and electric control means operative after said start switch has been closed for controlling said motive means to position said valve means to discharge liquid from said chamber to one of said receptacles when said receptacle reaches its respective loading position in an amount selectable independently of any amount delivered to the other of said receptacles and thereafter to admit liquid to said reservoir chamber up to a predetermined capacity.

13. In combination, a pair of receptacles each having its own independent course of travel, a reservoir chamber, valve means for charging liquid into said reservoir chamber and for discharging liquid from said reservoir chamber selectably to said receptacles when said receptacles are in their respective loading positions, motive means for positioning said valve means, a start switch for said motive means, a relay responsive to said start switch, a holding circuit for said relay, electrode means in said reservoir chamber for determining liquid levels therein, relay means responsive to said electrode means, and control means including said first mentioned relay and its holding circuit and said relay means for controlling said motive means, which control means is conjointly responsive to said electrode means, to the positions of said receptacles and to the positions of said valve means.

14. In combination, a pair of receptacles each having its own independent course of travel, a reservoir chamber, valve means for charging liquid into said reservoir chamber and for discharging liquid from said reservoir chamber selectably to said receptacles when said receptacles are in their respective loading positions, motive means for positioning said valve means, a start switch for said motive means, a relay responsive to said start switch, electrode means in said reservoir chamber for determining liquid levels therein, relay means responsive to said electrode means, and control means including said first mentioned relay and said relay means for controlling said motive means, which control means is conjointly responsive to said electrode means, to the positions of said receptacles and to the positions of said valve means.

15. In combination, a pair of receptacles each having its own independent course of travel, a reservoir chamber, valve means for charging liquid into said reservoir chamber and for discharging liquid from said reservoir chamber selectably to said receptacles when said receptacles are in their respective loading positions, motive means for positioning said valve means, a start switch for said motive means, a relay responsive to said start switch, electrode means in said reservoir chamber for determining liquid levels therein, said electrode means including an electrode for detecting a predetermined high liquid level and a plurality of electrodes for detecting a plurality of lower liquid levels, relay means responsive to said electrode means, and control means including said first mentioned relay and said relay means for controlling said motive means, which control means is conjointly responsive to said electrodes, to the positions of said receptacles and to the positions of said valve means.

16. In combination, a pair of receptacles each having its own independent course of travel, a reservoir chamber, valve means for charging liquid into said chamber and for discharging liquid from said chamber selectably to said receptacles when said receptacles are in their respective loading positions, motive means for operating said valve means, means for controlling said motive means, said controlling means having a plurality of definite positions to correspond to a plurality of definite positions of said valve means, and limiting means responsive to the levels of liquid within said chamber for controlling said motive means to effect the discharge of selectable amounts of liquid to each of said receptacles when it is in its respective loading position independently of the amount of liquid discharged to the other of said receptacles and to effect the subsequent refilling of liquid in said chamber to a predetermined level.

17. In combination, a pair of receptacles each having its own independent course of travel, a reservoir chamber, valve means for charging liquid into said chamber and for discharging liquid from said chamber selectably to said receptacles when said receptacles are in their respective loading positions, motive means for operating said valve means, control means for said motive means having definite positions for controlling said motive means to position said valve means, a start switch for said motive means, limiting means responsive to a predetermined high level of liquid within said chamber and also responsive selectably to a plurality of definite lower levels of liquid within said chamber for controlling said motive means, and means responsive to the positions of said receptacles for controlling said motive means.

ARTHUR J. WHITCOMB.
GORDON FOX.